United States Patent
Broadbelt et al.

(10) Patent No.: US 10,304,429 B1
(45) Date of Patent: May 28, 2019

(54) MAGNETIC MOUNT DEVICE

(71) Applicant: One Beat Better, LLC, Malvern, PA (US)

(72) Inventors: Jeffrey S. Broadbelt, Malvern, PA (US); Kenneth Miller, Jr., Spring City, PA (US)

(73) Assignee: One Beat Better, LLC, Malvern, PA (US)

( * ) Notice: Subject to any disclaimer, the term of this patent is extended or adjusted under 35 U.S.C. 154(b) by 0 days.

(21) Appl. No.: 15/408,707

(22) Filed: Jan. 18, 2017

(51) Int. Cl.
| | |
|---|---|
| *G10G 7/00* | (2006.01) |
| *F16M 13/02* | (2006.01) |
| *G10D 13/02* | (2006.01) |
| *F16B 1/00* | (2006.01) |

(52) U.S. Cl.
CPC .............. *G10G 7/00* (2013.01); *F16M 13/02* (2013.01); *G10D 13/026* (2013.01); *F16B 2001/0035* (2013.01)

(58) Field of Classification Search
CPC ......... G10D 13/02; G10D 13/026; G10G 7/00
USPC .................................. 248/206.5, 309.4, 683
See application file for complete search history.

(56) References Cited

U.S. PATENT DOCUMENTS

| | | | | |
|---|---|---|---|---|
| 3,245,165 A | * | 4/1966 | Podoloff | F16B 5/0258 248/467 |
| 3,514,731 A | * | 5/1970 | Drake | F16L 3/08 248/206.5 |
| 4,422,137 A | * | 12/1983 | Watts | F21V 15/04 248/206.5 |
| 4,457,425 A | * | 7/1984 | Cooper | A45C 11/326 206/350 |
| 4,779,509 A | * | 10/1988 | Weir | G10D 13/026 84/411 R |
| 4,965,708 A | * | 10/1990 | Louis | F21V 21/08 362/373 |
| 5,577,696 A | * | 11/1996 | Kramer | G08B 17/10 248/206.5 |
| 5,921,516 A | * | 7/1999 | Ho | A47B 91/00 248/206.5 |
| 6,213,440 B1 | * | 4/2001 | Kornback | B60R 13/005 248/206.5 |
| 6,739,567 B1 | * | 5/2004 | Curtis | E01F 9/681 248/519 |
| 7,374,142 B2 | * | 5/2008 | Carnevali | F16M 13/00 224/183 |
| 7,582,828 B2 | | 9/2009 | Ryan | |

(Continued)

FOREIGN PATENT DOCUMENTS

| | | |
|---|---|---|
| CN | 201877114 | 6/2011 |
| CN | 202650519 | 1/2013 |

(Continued)

OTHER PUBLICATIONS

Magnetic iPadtablet case to mount on a music stand, print out from website (10 pages).

(Continued)

*Primary Examiner* — Eret C McNichols
(74) *Attorney, Agent, or Firm* — Stephen G Stanton

(57) ABSTRACT

A mount device including: (a) a base portion comprised of a first material, the base portion having an exposed portion; (b) a magnetically attractable layer on the exposed portion of the base portion; and (c) a plurality of magnetic structures arranged about the magnetically attractable layer.

20 Claims, 8 Drawing Sheets

(56) References Cited

U.S. PATENT DOCUMENTS

| | | | | |
|---|---|---|---|---|
| 7,618,013 | B2 * | 11/2009 | Elmer | G09F 21/04 |
| | | | | 248/206.5 |
| 8,146,279 | B2 * | 4/2012 | Elmer | G09F 21/04 |
| | | | | 40/592 |
| 8,167,263 | B1 * | 5/2012 | Zampelli | B60P 7/0823 |
| | | | | 24/300 |
| 8,242,343 | B2 * | 8/2012 | Jones | G10D 13/026 |
| | | | | 84/421 |
| 8,376,292 | B2 * | 2/2013 | Cicco | B60R 11/02 |
| | | | | 248/176.1 |
| 8,567,423 | B1 * | 10/2013 | Combs, Jr. | E04H 15/32 |
| | | | | 135/120.3 |
| 8,704,623 | B2 * | 4/2014 | Dumonski | H01B 13/01227 |
| | | | | 335/285 |
| 8,714,511 | B2 * | 5/2014 | Zoeteman | A45B 23/00 |
| | | | | 135/16 |
| 8,824,166 | B2 | 9/2014 | Rohrbach | |
| 8,967,562 | B1 * | 3/2015 | Bileth | F16M 13/022 |
| | | | | 220/23.2 |
| 9,153,152 | B1 * | 10/2015 | Elmer | H01F 7/0221 |
| 9,683,589 | B2 * | 6/2017 | Ports | F16B 1/00 |
| 2004/0232291 | A1 | 11/2004 | Carnevali | |
| 2009/0159307 | A1 | 6/2009 | Gober | |
| 2010/0024175 | A1 * | 2/2010 | Cserpes | A45F 5/04 |
| | | | | 24/303 |
| 2013/0221189 | A1 * | 8/2013 | Kubin | F16M 13/04 |
| | | | | 248/683 |
| 2013/0240470 | A1 | 9/2013 | Huang | |
| 2014/0263908 | A1 | 9/2014 | Franklin | |
| 2015/0034799 | A1 * | 2/2015 | Krapf | B43L 1/00 |
| | | | | 248/683 |
| 2015/0216331 | A1 * | 8/2015 | Sanchez | F21V 33/004 |
| | | | | 362/140 |
| 2015/0369418 | A1 | 12/2015 | Wong | |

FOREIGN PATENT DOCUMENTS

| | | |
|---|---|---|
| CN | 202905145 | 4/2013 |
| CN | 203225098 | 10/2013 |
| CN | 203849988 | 9/2014 |
| CN | 205158897 | 4/2016 |

OTHER PUBLICATIONS

ATD Tools 8762 Stainless Steel Square Magnetic Parts Tray, print out from website (4 pages).

K&J Magnetics Screenshot 1 of 2 Jan. 16, 2017 10.29.58, Calculation of magnetic pull force, print out from website (p. 1 of 2) (1 page).

K&J Magnetics 2 of 2 Jan. 16, 2017 10.29.58, Calculation of magnetic pull force, print out from website (p. 2 of 2) (1 page).

Authorized on sale of one claimed embodiment evidenced by print out of Steve Weiss Music website (Steve Weiss Music website offer for sale Nov.-Dec. 2016) (1 page).

Authorized One Beat Better—Timbre Jam—Maple—High Pitch Pack web page print out partially showing one claimed embodiment (1 page).

"The Scou™ Danny and Beth Gottlieb Signature Practice pad" website (http://www.offworldpercussion.com/The_SCOUT.html [Feb. 21, 2017]); "© Copyright 2008/2016 OffWorld Percussion Inc."

"Danny Gottlieb demonstrates the new Offworld Danny and Beth Gottllieb Scout Pad" webpage having a YouTube video (https://www.youtube.com/watch?v=M-gFmbquMIA [Feb. 21, 2017]); "Published on Jan. 10, 2014".

* cited by examiner

MAGNETIC MOUNT DEVICE

FIELD

The present invention relates to mounting devices, and more specifically to improved magnetic mounting devices and systems suitable for use to mount percussion instruments and accessories.

BACKGROUND

Drummers and percussionists use many accessory percussion instruments and attachments to compliment their core instrument, such as a drum kit, or percussion ensemble, which may include bongos, chimes, triangles, cymbals, wood blocks and temple blocks for example. Each of these instruments or accessories may come with varying methods to mount them to either a cymbal stand, high hat stand, special stand or even to the edges of drum rims. These mounting systems vary greatly and are usually comprised of a clamping method and/or screwing method that attaches directly to the male thread of a cymbal stand or special stand designed just for the particular accessory. Some of the larger instruments/accessories have the mount hardware directly and permanently attached to the actual body, which makes it difficult to mount and un-mount them because of the size of the instrument/accessory. Being percussion instruments and accessories, they are subject to being hit or struck with a drumstick or other like device, and the design/development/manufacture of any magnetic mounting device/system must take this into account.

One example of a conventional magnetic mounting devices include a "Do-it-yourself magnetic iPad® electronic tablet mount" that mounts an electronic tablet to a music stand. Six exposed rare-earth magnets are only glued to a corresponding hardshell tablet case usually constructed of plastic. The expose magnet surfaces are covered with duct tape to protect them, and the back of an electronic table is placed adjacent to the modified hardshell case and the tablet back contacts the magnets and is held by those magnets. The hardshell case s then magnetically adhered to a metal surface such as a refrigerator or music stand.

Another example of exposed magnets is disclosed in U.S. Patent Publication No. 2013/0240470 A1 to Chi-Jiun Huang (hereinafter "Huang". Huang discloses an attachment shelf with a plurality of magnetic members and two stop members mounted on a base and a magnetic element between the two stop members. This may attach a smaller article, such as a box or key, containing a magnetic material to a larger object, such as a car, furniture, electric appliance and the like containing a magnetic material by the magnetic actions of the magnetic members and the magnetic element. For example, in Huang, a central magnet is surrounded by a plurality of magnets.

U.S. Pub. No. 2004/02322191 A to Carnevali (hereafter "Carnevali") discloses an apparatus for removably retaining by magnetic attraction any of various handheld devices. The magnetic mounting apparatus provides a magnetic mounting platform having a socket-like recessed support surface surrounded by a raised lip and backed by an interface structure that secures the magnetic mounting platform assembly to an external mounting surface. A permanent magnet is disposed within a cavity that positions the magnet in close proximity to the flat support surface. A separate and distinct ferromagnetic adapter plate is adhered to a device to be supported, the adapter plate being structured for accommodation by the socket-like recessed support surface for removably retaining the device by magnetic attraction to the magnetic mounting platform. For example, this construction includes, for example, a recessed support surface of a shallow recessed socket overlying a magnet adapted to receive an adapter plate.

U.S. Pat. No. 7,582,828 B2 to Ryan et al. (hereafter "Ryan") discloses a system and method for mounting an electrical device on a wall. The electrical device has a mount and a base. The base connects to an electrical outlet on a surface, and has a first electrical connector, and a magnetically attractable faceplate. The electrical device has a magnet and a second electrical conductor that are positioned so that the magnet mates with the magnetically attractable face plate, and the second electrical connector mates with the first electrical connector. For example, Ryan includes a circular depression within which the magnets are received, and within which the base is received.

U.S. Patent Publication No. 2014/0263908 A1 to Franklin (hereinafter "Franklin") discloses a mounting apparatus allowing an object to be mounted to a mounting surface via magnetic attractions between different planes of engagement. Through the movement of planes of magnets, an object that is brought in proximity to the mounting apparatus may engage one of the magnetic planes (e.g., see FIG. 2) and then be moved further to engage the other magnetic plane (e.g., see FIG. 3), with the combined magnetic force being configured to support the particular object for which the mounting apparatus is designed. The engagement and/or disengagement of the object from the mounting apparatus can thus occur in stages and/or in a tiered manner. Various mounting structures are also disclosed, for example, in FIGS. 1-18. For example, Franklin requires different magnetic planes that are manipulated during engagement with an object and disengagement with the object.

U.S. Patent Publication No. 2015/0369418 A1 to Wong (hereinafter "Wong") discloses a convertible stand/table may be converted for use alternately as a table or a stand, and in particular, a stand suitable for use in mounting, securing, holding, or otherwise retaining or mounting one or more items for viewing and/or use by an individual, including, for example, a tablet or other portable computing device. Further, in some configurations, a magnetic mounting pad, including a suction cup surface and at least one permanent magnet, may be used to mount a portable electronic device such as a tablet on an inclined and magnetically-attractive surface, with the suction cup surface, e.g., provided by a microsuction layer, adhered to the back of the portable electronic device, and with the permanent magnet attracted to the magnetically-attractive surface.

However, conventional magnetic mount systems have several drawbacks and are not suited to engage and retain an object that will be struck with drum sticks or the like.

SUMMARY

The present invention seeks to provide an improved magnetic mount device and system that may be used to mount and retain percussion instruments and accessories while such instruments and accessories are struck during practice sessions or performances.

In one exemplary embodiment of the present invention, a mount device includes: (a) a base portion comprised of a first material, the base portion having an exposed portion; (b) a magnetically attractable layer on the exposed portion of the base portion; and (c) a plurality of magnetic structures arranged about the magnetically attractable layer. In another exemplary embodiment of the present invention, a mount device includes: (a) a base portion comprised of a first material, the base portion having an exposed portion; (b) a magnetically attractable layer upon the exposed portion of the base portion; (c) a plurality of magnetic structures arranged upon the magnetically attractable layer; and (d) respective protective layers over each of the plurality of magnetic structures. In yet another exemplary embodiment of the present invention, a mount device includes: (a) a base portion comprised of a first material, the base portion having an exposed portion; (b) a magnetically attractable layer upon the exposed portion of the base portion; (c) a plurality of magnetic structures arranged upon the magnetically attractable layer; and (d) a flexible layer upon the magnetically attractable layer and surrounding the plurality of magnetic structures, wherein the plurality of magnetic structures each have an exposed surface recessed below a surface of the flexible layer. In yet another exemplary embodiment of the present invention, a mount device system including (1) a mount device including (a) base portion comprised of a first material, the base portion having an exposed portion, (b) a magnetically attractable layer on the exposed portion of the base portion, and (c) a plurality of magnetic structures arranged upon the magnetically attractable layer, wherein exposed surfaces of the respective magnetic structures lie in a common plane; and (2) a magnetically attractable structure on a lower side of an object to be mounted to the mount device, wherein when the magnetically attractable structure is brought in proximity of the mount device and mounted on the mount device, a magnetic attraction is formed between the magnetically attractable structure and the mount device such that a pull force is increased by the use of the mount device magnetically attractable layer.

BRIEF DESCRIPTION OF THE DRAWINGS

The present invention will be more clearly understood from the following description taken in conjunction with the accompanying drawings in which like reference numerals designate similar or corresponding elements, regions and portions and in which.

DETAILED DESCRIPTION OF THE PREFERRED EMBODIMENT

Figure 1:
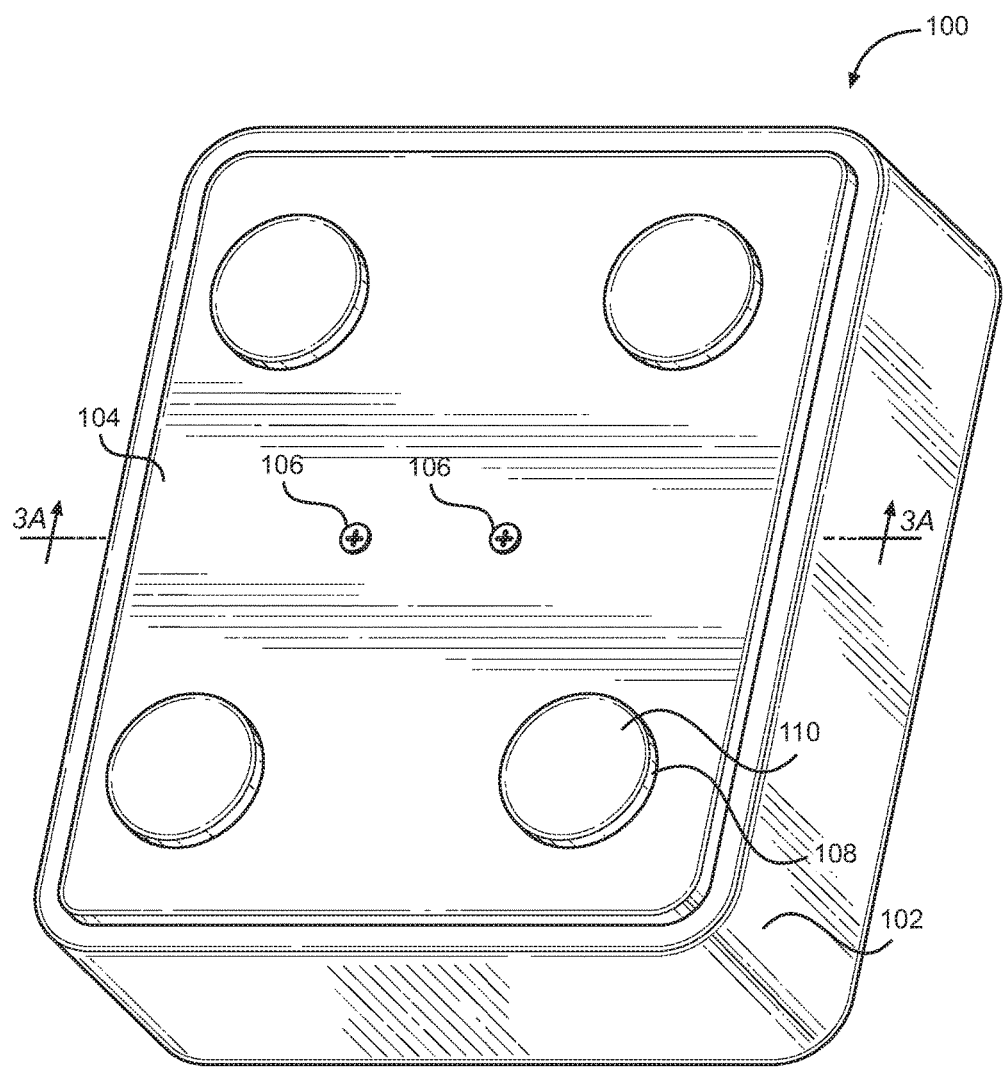
FIG. 1 is a perspective top view of a mount device made in accordance with an exemplary embodiment of the present invention.

It is understood that the accompanying drawings do not necessarily illustrate each and every detail of the construction or use of the present invention as one of ordinary skill in the art would understand. The term "about" when referring to a numerical range or value is a convenience and is to be interpreted as plus or minus 10% of that value or range. For example "from about 100 to 1000" is to be interpreted as within the range of 90 to 1100 and "about 1000" is to be interpreted as within the range of 900 to 1100. Dimensions provided for exemplary embodiments are only exemplary, and differing dimensions are contemplated for each exemplary embodiment.

When a magnet is placed between two magnetizable plates, such as steel plates, the pull force is increased. For example, and as exemplified at http://www.kjmagnetics.com/calculator.asp (Jan. 16, 2017, for a grade N42 magnetic disc having a diameter of about 0.75" and a thickness of about 0.125 inches, the pull force is about 9.76 lb for a magnet to a steel plate, and is about 9.76 lb for a magnet to magnet, but is about 36.00 lb for a magnet between two steel plates (e.g., see http://www.kjmagnetics.com/calculator.asp).

As such, FIGS. 1-2, and 3A-3C illustrate an exemplary embodiment of magnetic mount device 100 and system of the present invention. Magnetic mount device 100 includes base 102, plate 104 affixed to upper surface 112 of base 102, and a plurality of magnets 108 affixed to plate 104. Base 102 may be comprised of a hard substance such as, for example, wood, hard plastic. Plate 104 is comprised of a magnetically attractable material such as a magnetically attractable metal, for example steel. Plate 104 may be affixed to base 102 using screws 106, for example. Magnets 108 are affixed to plate 104 using, for example, screws inserted into through holes formed in the respective corners of plate 104 and underlying base 102. As illustrate in FIG. 1, magnets 108 are placed at each corner of mount device 100. While mount device 100 is shown square in shape, it may be of a shape suitable for its purpose, for example it may be rectangular, oval, circular, etc. Optional covering material 110 is placed over each magnet 108 to protect magnets 108 during attachment/reattachment to a magnetically attractable structure and to prevent so-called clanking, or noise associated with hard surfaces meeting with force or velocity. Covering material 110 may be, for example, rubber or rubber-like material such as, for example, neoprene or polychloroprene synthetic rubbers, and may prevent/reduce any lateral slippage of magnetically attractable material 300/instrument 302 relative to magnets 108/magnetic mount device 100. Covering material 110 may be adhered to magnets 108 by an adhesive or the like. Such a neoprene tape may have a thickness of about ⅟32" for a ¾" wide magnet, and from about 50-80 on the durometer hardness scale or preferably about 60 on the durometer hardness scale. Neoprene coverings 110 may also serve to minimize/eliminate sliding of magnetically attractable material 300/instrument 302 over magnets 108 when connected.

Figure 2:
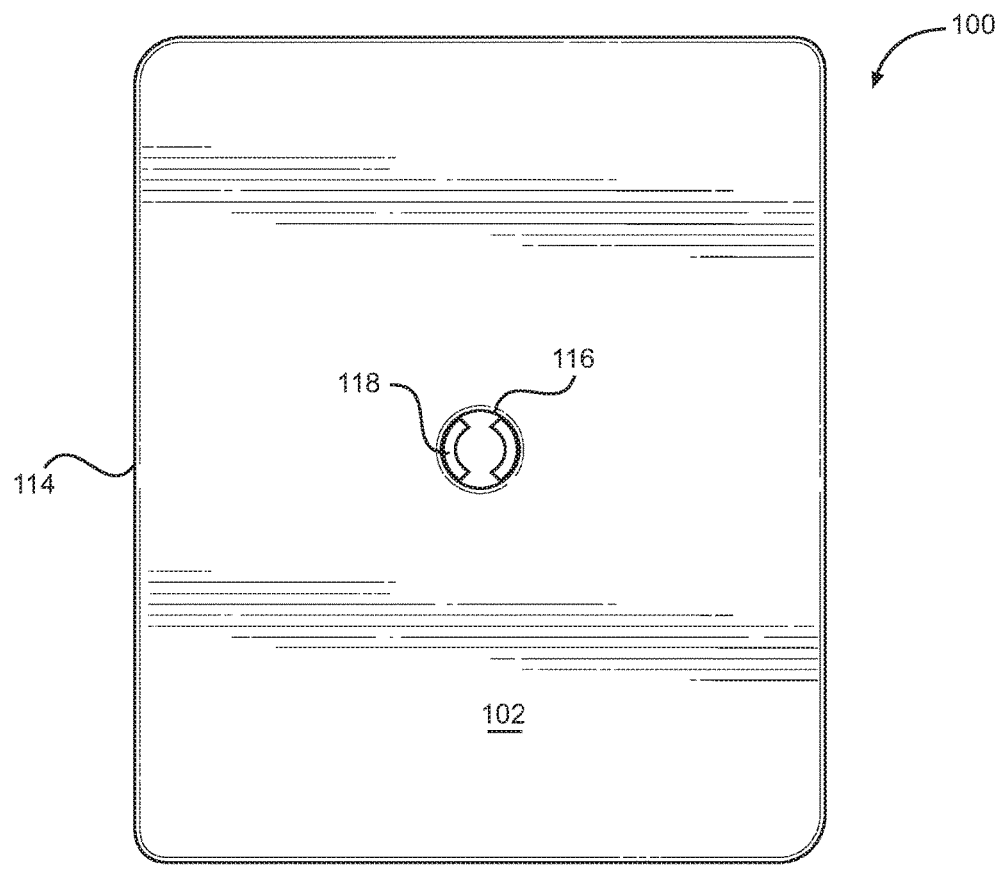
FIG. 2 is a bottom plan view of a mount device made in accordance with another exemplary embodiment of the present invention.

FIG. 2 is a bottom, plan view of mount device 100 of FIG. 1 in accordance with a preferred embodiment of the present invention with a central hole 116 formed, for example by drilling, at the center of lower or reverse side 114 of base 102. Female threaded structure 118 is placed within hole 116 and is adapted for attachment to a corresponding male threaded structure such as a threaded bolt, for example, affixed to a stand, a drum rim, for example (not shown). Mount device 100 may be placed over the male threaded structure and turned to engage the male threaded structure with the female threaded structure until mount device 100 is securely attached to the stand having the male threaded structure. This may securely hold mount device 100 in place during use.

Figure 3A:
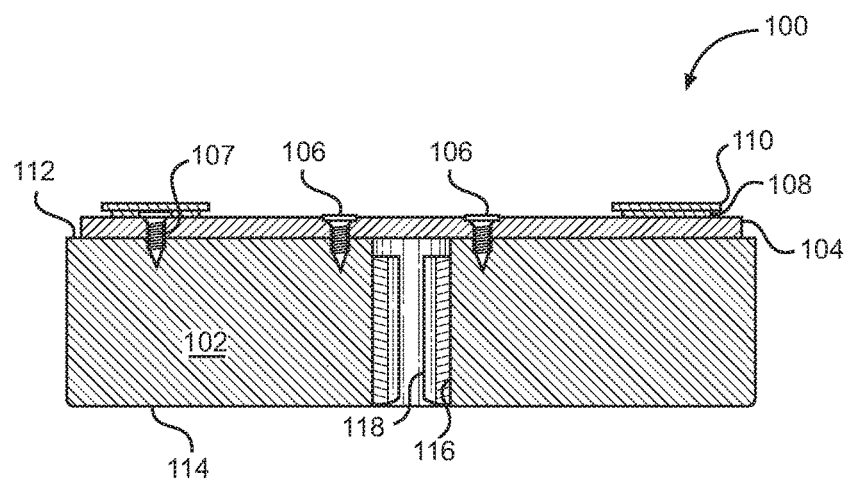
FIG. 3A-3C are a series of a side views of a mount device of FIG. 1, with FIG. 3A being a side cut-away view along line 3-3 of FIG. 1, made in accordance with an exemplary embodiment of the present invention showing magnetic attraction to a magnetically attractable structure.
Figure 3B:
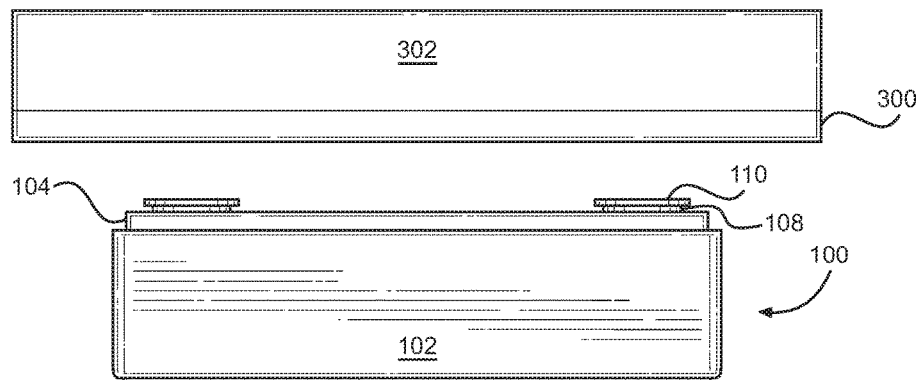
Figure 3C:
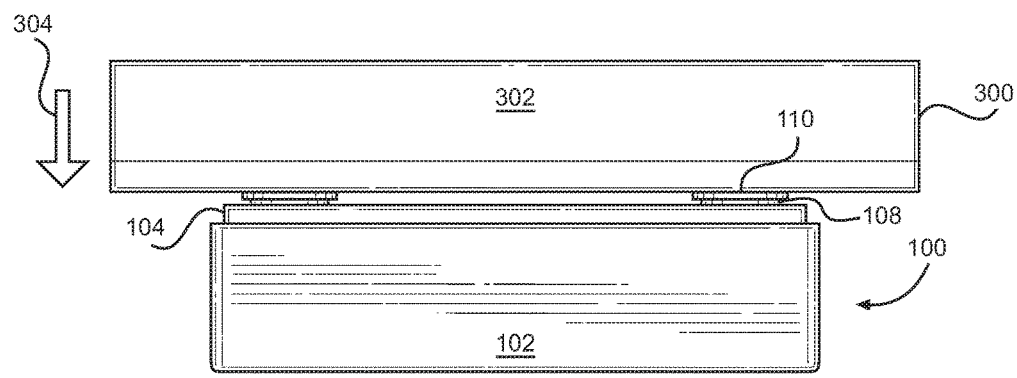

FIGS. 3A-3C are side views of mount device 100, with FIG. 3A being a side cut-away view along line 3-3 of FIG. 1 in accordance with a preferred embodiment of the present invention. As illustrated in FIG. 3A, magnetically attractable plate 104 is attached to base 102 by screws 106. Magnets 108 are affixed to magnetically attractable plate 104 by a strong adhesive (e.g., as illustrated on magnet 108 on the right) or by counter-sunk screws 107 (e.g., as illustrated on magnet 108 on the left) penetrating magnetically attractable plate 104 and underlying base 102. Optional covering material 110 covers the entire upper surface of magnets 108 to protect them and to prevent/reduce/minimize cracking, spalling or splitting of magnets 108 due to attachment/reattachment to a magnetically attractable structure (e.g., see magnetically attractable structure 300 in FIGS. 3B-3C). Hole or opening 116 is formed through the center of base 102 and may expose a portion of magnetically attractable plate 104. Internal female threaded structure 118 is secured at least partially within hole 116 and is adapted to receive a corresponding male threaded structure (not shown) on a stand or the like to which mount device 100 is to be affixed for use. Structure 118 may have external threading, and may be slightly larger than hole 116 so structure 118 may be screwed into hole 116 and securely retained therein.

For example, finished mount device 100 may be square shaped and may measure approximately 3.75"×3.75". Mount device 100 may have a total thickness or height of almost about one inch, including the elevation of magnets 108 positioned on magnetically attractable plate 104. It is understood that finished mount device 100 may also be rectangular, oval, round, etc.

Base 102 may be fabricated with a hard substance such as wood or high density plastic and may be approximately ¾" thick. Base 102 may have one large hole 116 drilled through its center and measuring approximately 13/32" in diameter. Secured to and within 13/32" hole 116 may be 8 MM female insert screw 118 designed for soft material or high-density plastic measuring about ⅝" long. Female insert screw 118 may be attached to base 102 by screwing female insert screw 118 into hole 116 with the outside portions of female insert screw 118 having a male thread design for insertion therein.

Attached to base 102 on the opposite side of where insert screw 118 is placed, may be square steel plate 104 measuring about 3.5"×3.5" square with a thickness of about 13 gauge or thicker. Steel plate 104 may be centered on base 102 where a reveal of about ⅛" may show between steel plate 104's edges and base 102 below. Four or more through holes (not shown) may be drilled through steel plate 104 near the peripheral edges and each corner to allow a #4 or #6 wood screw to pass through and into base 102 for attachment of both steel plate 104 itself as well as four or more magnets 108 on top of steel plate 104. Two or more additional slightly larger holes may be drilled through steel plate 104 about ½" from the outer edge of the 13/32" through hole to allow for #8 wood or sheet metal screws 106, for example, to pass through and into base 102 below. Screws 106 may be used to further adhere steel plate 104 to base 102 and to prevent/minimize lifting of metal plate 104 from the eventual screwing onto the male portion of, for example, a cymbal stand, as steel plate 104 acts as the stop for the male end of such a cymbal stand. Further, steel plate 104 may be attached/affixed to base 102 by other methods/structures. For example, base 102 may be comprised of plastic or the like with molded in snap features to which steel plate 104 may be affixed to base 102. Using such molded in snap features may eliminate components and lower costs while still preventing/minimizing lifting of steel plate 104. Further, steel plate 104 may be adhered to base 102 using a suitable adhesive or glue, for example. It is noted that these structures/methods may be applied to other embodiments of the present invention as appropriate.

Four or more magnets 108 may have a countersink design to accept a #4 or #6 screw 106, for example, where screws 106 may be flush, or below, the exposed surface of respective magnets 108. The cumulative magnetic pull power of magnets 108 when positioned between two steel plates (including steel plate 104) may have a pull power of a minimum design standard of about 120 pounds. The cumulative pull power is a function of the size of each magnet 108 (thickness and surface area), and the number of magnets 108 used. Using smaller magnets may require more of them while using larger magnets may reduce the need for the number of magnets 108. The exposed surfaces of respective magnets 108 may be optionally covered by a material such as, for example, rubber or rubber-like, such as neoprene or polychloroprene synthetic rubbers, that adheres to magnets 108 using an adhesive or the like. Such a neoprene tape may have a thickness of about 1/32" for a ¾" wide magnet.

FIGS. 3B-3C are side views illustrating mounting of mount device 100 to magnetically attractable structure 300. As illustrated in FIG. 3B, magnetically attractable structure 300 (which may be connected/affixed to, for example, percussion instrument or accessory 302) is positioned proximate mount device 100 in a desirable position as illustrated in FIG. 3B. As illustrated in FIG. 3C, magnetically attractable structure 300 is then moved 304 towards mount device 100 so that structure 300 is mounted to mount device 100 by the magnetic attraction of contacting magnets 108/optional magnet covering material 110 and retained thereon/thereto by the magnetic force of such attraction. It has been found that the use of magnetically attractable plate 104 beneath magnets 108 increases the magnetic attraction between magnetically attractable structure 300 and mount device 100 as discussed above. Magnetically attractable structure 300 is held to mount device 100 with sufficient force/attraction so that any percussion instrument or accessory 302 (generally instrument 302) affixed to magnetically attractable structure 300 may be utilized for its intended purpose such as striking/playing during practice or a performance.

To remove, or dismount, magnetically attractable structure 300/instrument 302 from magnetic mount device 100, magnetically attractable structure 300/instrument 302 may be, for example, grasped and pulled from mount device 100 either straight away, or by separating magnetically attractable structure 300 from one edge or side of mount device 100 and 'pealing' it from mount device 100. To prevent unintended attraction of mount device 100 to other magnetically attractable objects, such as steel, a dummy magnetically attractable structure (not shown) may cover mount device 100 during transport and assembly, or a padded dummy structure (e.g., a padded bag or box) covering magnetic mount device 100 introducing an air gap sufficient to reduce the magnetic attraction of magnets 108 above/around the padded dummy structure so as to prevent/minimize any magnetic attraction to any other unwanted magnetically attractable objects.

Figure 4:
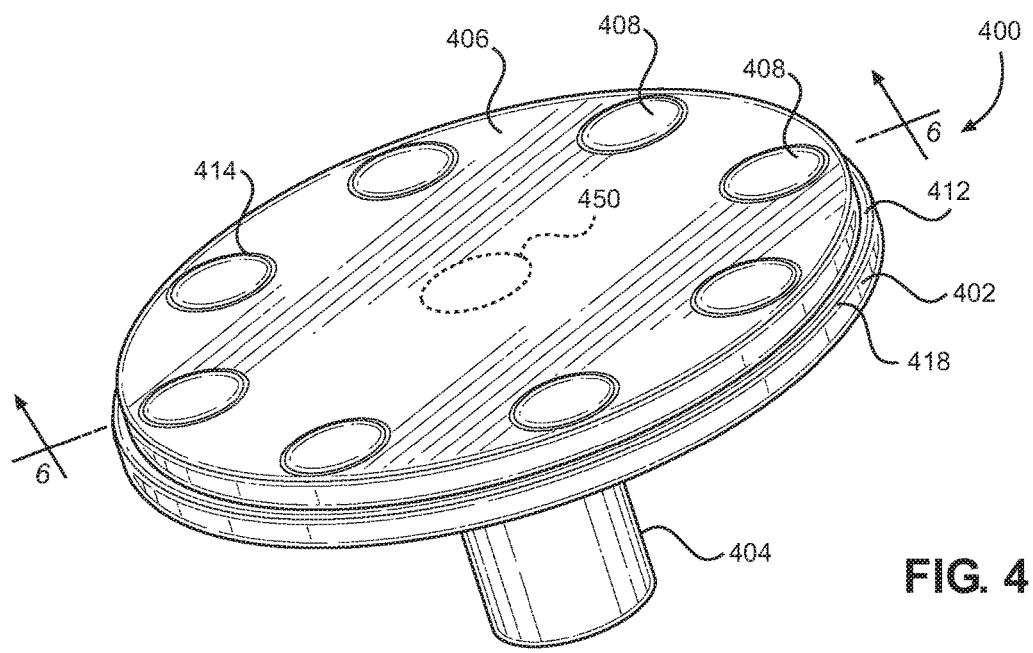
FIG. 4 is perspective view of a mount device made in accordance with another exemplary embodiment of the present invention.

FIG. 4 illustrates an alternate exemplary embodiment of the present invention wherein magnets 408 are affixed to a magnetically attractable base 402 and which upper exposed surfaces are recessed within a flexible covering/layer 406. FIG. 4 is a perspective view illustrating mount device 400 with a protective flexible layer 406 partially overlying magnetically attractable plate 402, for example steel magnetically attractable plate 402. As illustrated flexible layer 406 is affixed to plate 402 using, for example, a suitable adhesive or glue-type material, and exposes edge 418, and a portion of upper surface 412, of plate 402. Flexible layer 406 may be formed by stamping or die cutting from flat sheets of flexible material, for example, and has a thickness greater than the thickness of magnets 408 so that magnets 408 are recessed within magnet openings 414 of flexible layer 406. For example magnets 408 may be recessed by about 1/32" below upper surface 407 of flexible layer 406. Magnets are affixed to plate 402 using, for example, a suitable adhesive or glue-type material. Mount device 400 includes a shaft 404 on lower side 415 of plate 402 that may be: screwed onto plate 402; tack welded onto plate 402; compression fit; or integral with plate 402. It is noted that an additional central magnet (not shown) may be affixed to plate 402, and exposed through a respective magnet opening, as shown at position 450.

Figure 5:
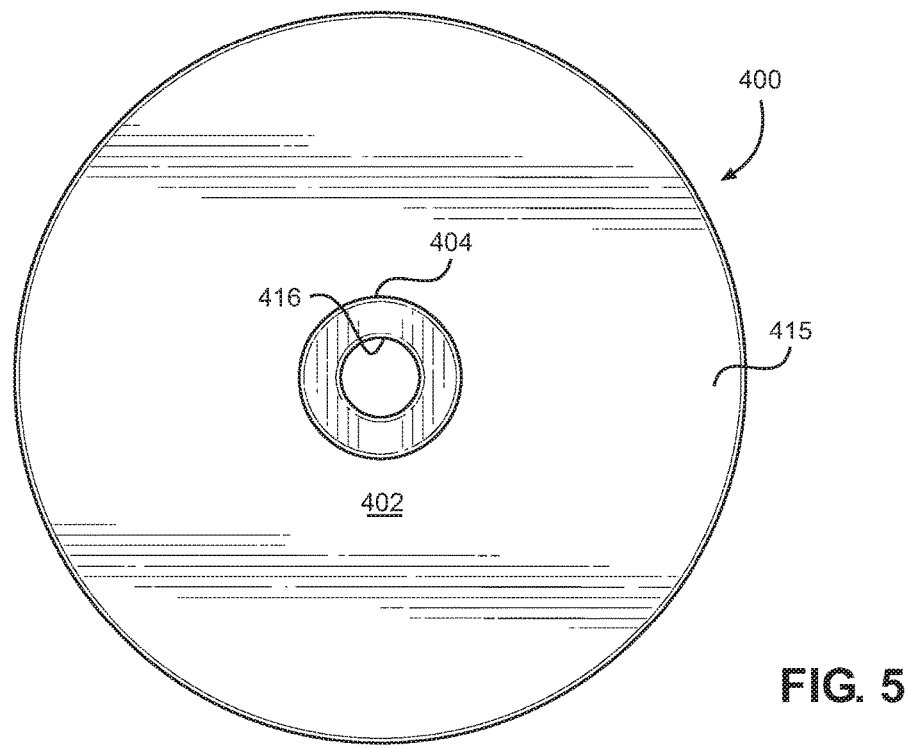
FIG. 5 is bottom plan view of a mount device of FIG. 4 made in accordance with an exemplary embodiment of the present invention.

As illustrated in FIG. 5, a bottom up, plan view of mount device 400, shaft 404 may include central opening 416 that may be threaded to facilitate attachment to a corresponding male threaded structure such as a threaded bolt, for example, affixed to a stand, for example (not shown). Mount device 400 may be placed over the male threaded structure and turned to engage the male threaded structure with female threaded shaft 404, until mount device 400 is securely attached to the stand having the male threaded structure. This may securely hold mount device 400 in place during use.

Figure 6A:
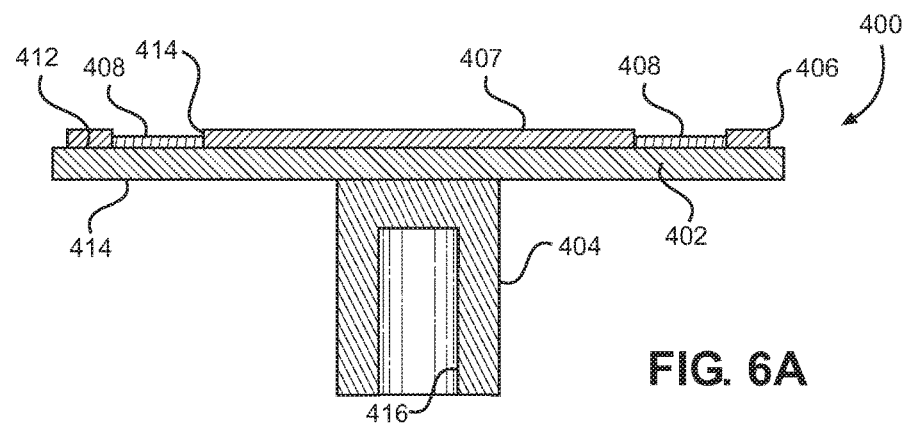
FIGS. 6A-6C are a series of a side, cut-away view of a mount device of FIG. 4 along line 6-6 made in accordance with an exemplary embodiment of the present invention also showing magnetic attraction to a magnetically attractable structure.
Figure 6B:
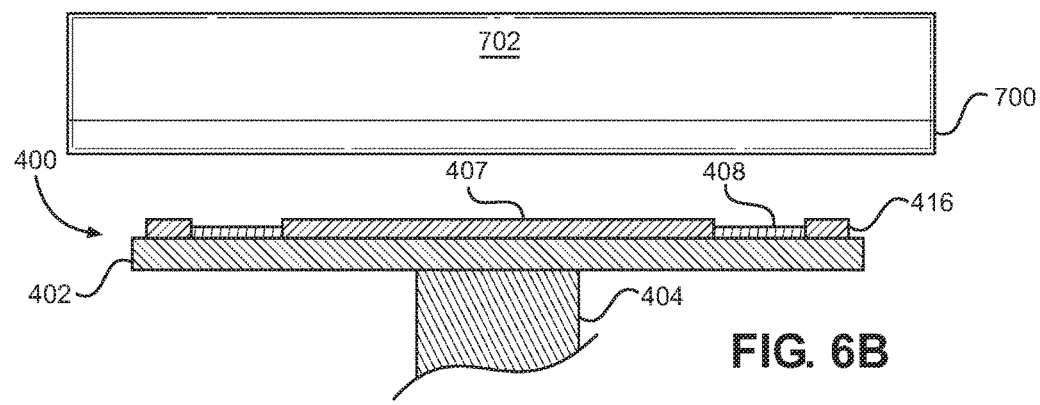
Figure 6C:
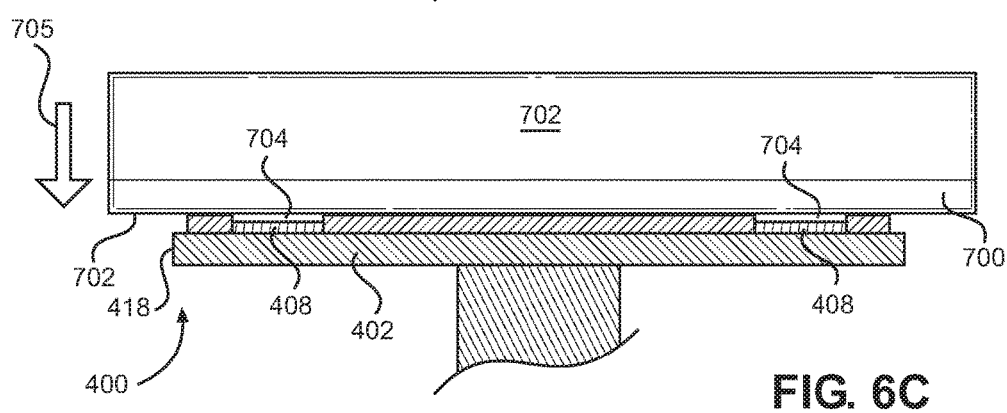

FIGS. 6A-6C are side views of mount device 100 in accordance with a preferred embodiment of the present invention, with FIG. 6A being a side view along line 6-6 of FIG. 4. As illustrated in FIG. 3A, shaft 404 includes threaded opening 416 adapted to receive a corresponding male threaded structure. Magnets 408 may be affixed to magnetically attractable plate 402 by a strong adhesive or glue, for example. Magnets 408 fit within magnet openings 414 of flexible layer 406, and are recessed below upper surface 407 of flexible layer 406. This tends to protect magnets 408, the upper surfaces of magnets 408, during attachment and disengagement to and from magnetically attractable object 700 (for example, see FIGS. 6B-6C), without the need for any magnet covering material, and protect magnets 408 and prevents/reduces/minimizes any cracking, spalling or splitting of magnets 408. Flexible layer 406 may prevent/reduce any lateral slippage of magnetically attractable object 700 in relation to magnetic mount device 400. As noted above, internal female threaded shaft 404 is adapted to receive a corresponding male threaded structure (not shown) on a stand or the like to which mount device 400 is to be affixed for use.

FIGS. 6B-6C are side views illustrating mounting of mount device 400 to magnetically attractable structure 700. As illustrated in FIG. 6B, magnetically attractable structure 700 (which may be connected/affixed to, for example, percussion instrument or accessory 702) is positioned proximate mount device 400 in a desirable position as illustrated in FIG. 6B. As illustrated in FIG. 6C, magnetically attractable structure 700 is then moved 705 towards mount device 100 so that structure 700 is mounted to mount device 400 by the magnetic attraction of magnets 408 until magnetically attractable structure 700 contacts upper surface 407 and is retained thereon/thereto by the magnetic force of such attraction. Upon contact there may be an air gap 704 of about 1/32" between the top of magnets 408 and the exposed surface of magnetically attractable structure 700. It is also appreciated that the magnetic attraction may decrease air gap 704 and may eliminate air gap 704 for one or more of magnets 408 in a controlled manner. That is, the recession of magnets 408 below upper surface 407 of flexible layer 406 prevents/minimizes/reduces any potential damage to magnets 408 and clanking, by slowing the velocity of any meeting of magnetically attractable structure 700 against the top of magnets 408. Further, it has been found that the use of magnetically attractable plate 402 beneath magnets 408 increases the magnetic attraction between magnetically attractable structure 700 and mount device 400. Magnetically attractable structure 700 is held to mount device 400 with sufficient force/attraction so that any percussion instrument or accessory 702 (generally instrument 702) affixed to magnetically attractable structure 400 may be utilized for its intended purpose such as striking/playing during practice or a performance.

To remove, or dismount, magnetically attractable structure 700/instrument 702 from magnetic mount device 400, magnetically attractable structure 700/instrument 702 may be, for example, grasped and pulled from mount device 400 either straight away, or by separating magnetically attractable structure 700 from one edge or side of mount device 400 and 'pealing' it from mount device 400. To prevent unintended attraction of mount device 400 to other magnetically attractable objects, such as steel, a dummy magnetically attractable structure (not shown) may cover mount device 400 during transport and assembly, or a padded dummy structure (e.g., a padded bag or box) covering mount device 400 introducing an air gap sufficient to reduce the magnetic attraction of magnets 408 above/around the padded dummy structure so as to prevent/minimize any magnetic attraction to any other unwanted magnetically attractable objects.

Figure 7:
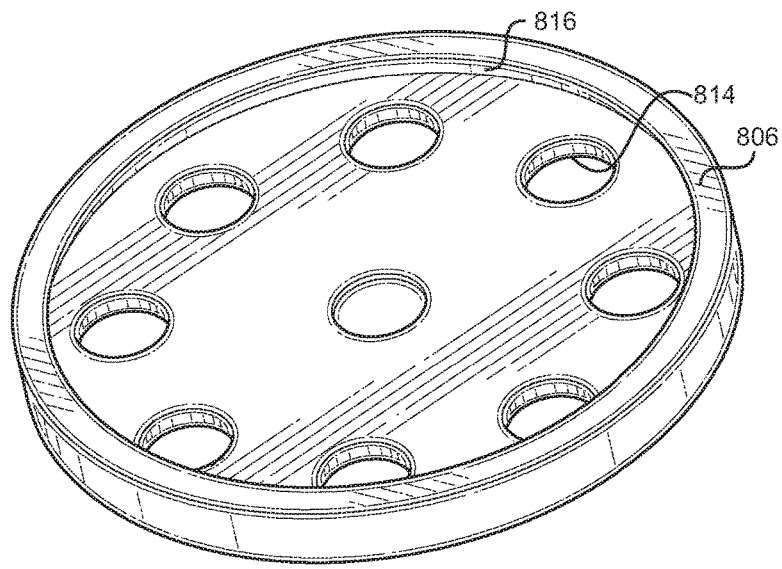
FIG. 7 is a bottom perspective top view of a wrap-around flexible covering/layer of a mount device made in accordance with another exemplary embodiment of the present invention.
Figure 8A:
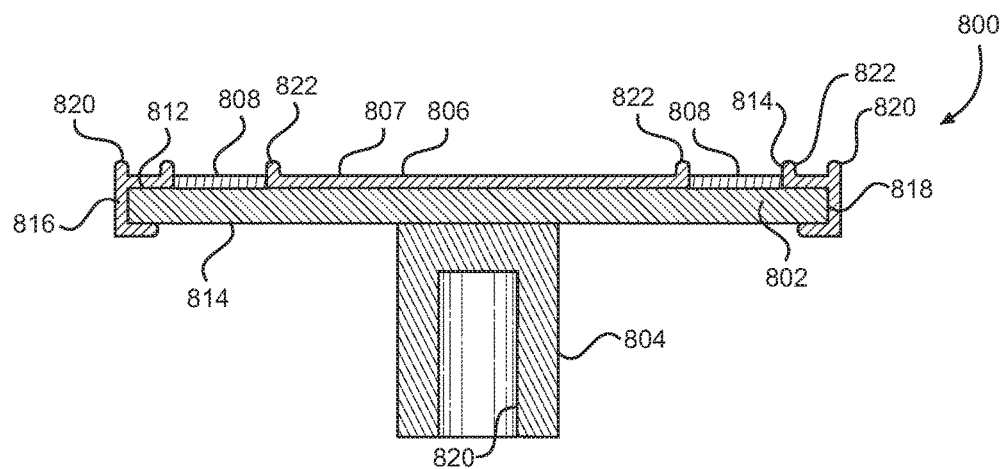
FIGS. 8A-8C are a series of a side, cut-away view of a mount device of made in accordance with another exemplary embodiment of the present invention also showing magnetic attraction to a magnetically attractable structure.
Figure 8B:
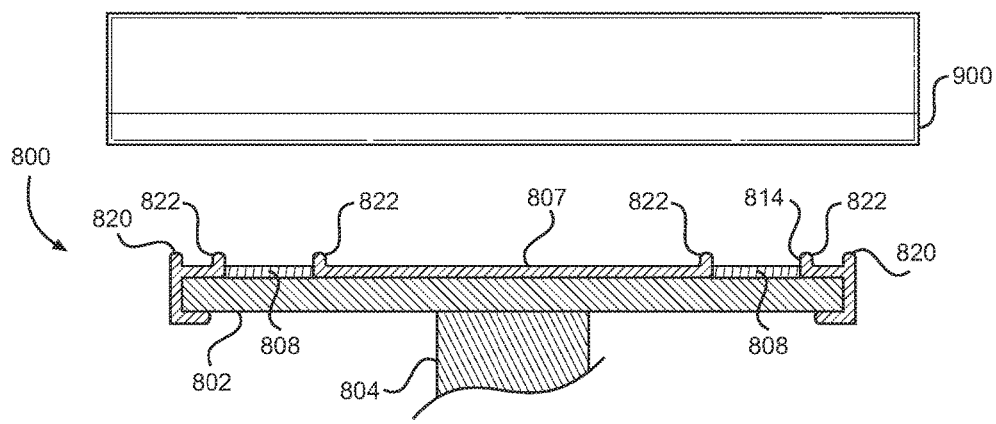
Figure 8C:
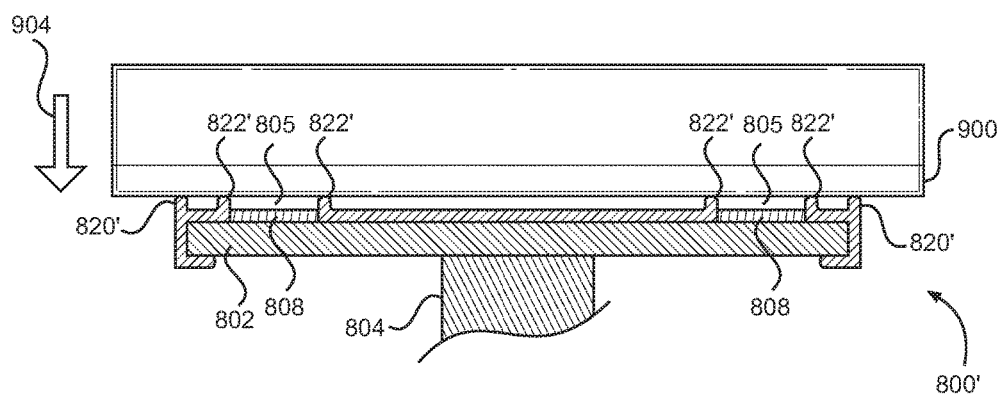
Figure 9:
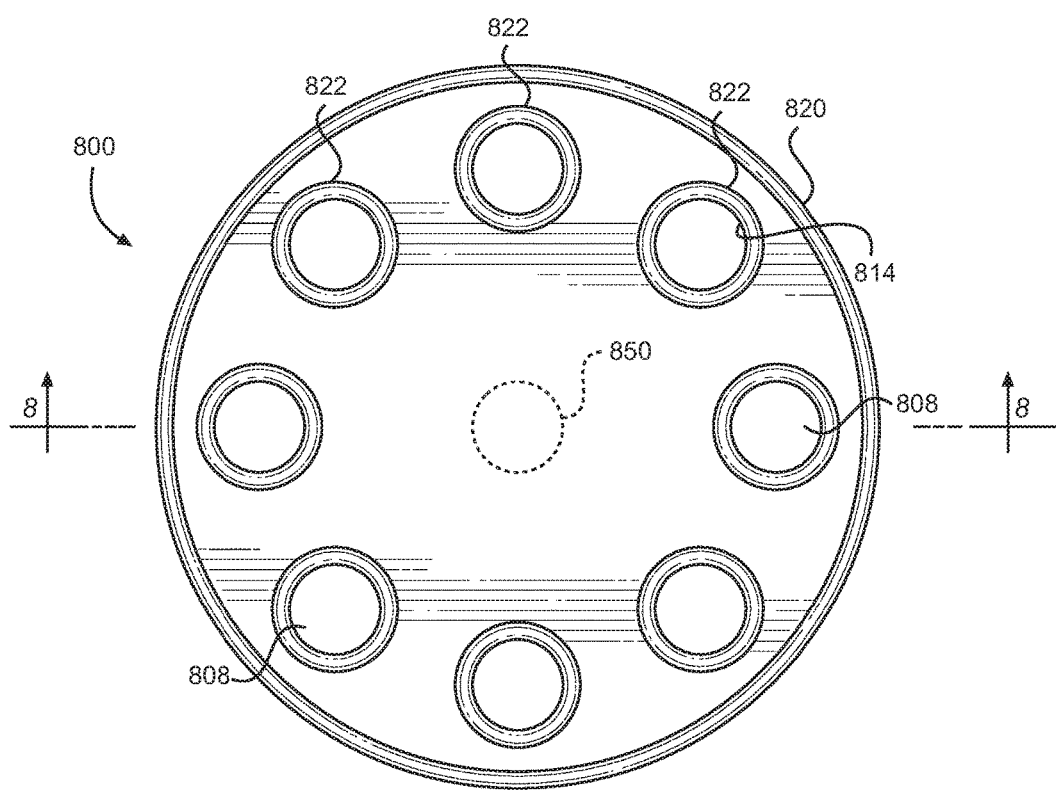
FIG. 9 is top down, plan view, of FIG. 8A.

FIGS. 8A-8C are side views of mount device 800 made in accordance with an embodiment of the present invention, with FIG. 8A being a side view along line 8-8 of FIG. 9. The use of magnet ridges 822 and outer ridge 820 permit a thinner remaining flexible covering/layer 806, and thus less material for flexible cover 806. As illustrated in FIG. 8A, shaft 804 includes threaded opening 820 adapted to receive a corresponding male threaded structure. Magnets 808 may be affixed to magnetically attractable base 802 by a strong adhesive or glue. Magnets 808 fit within magnet openings 814 of flexible layer 406, and are recessed below magnet ridges 822 of flexible covering 806. This tends to protect magnets 808, the upper surfaces of magnets 808, during attachment and disengagement to and from magnetically attractable object 900 (for example, see FIGS. 8B-8C), without the need for any magnet covering material, and protect magnets 808 and may prevents/reduces/minimizes any cracking, spalling or splitting of magnets 808. Outer ridge 820 surrounds the periphery of flexible covering 806. Magnet ridges 820 and outer ridge 822 rise above upper surface 807 of flexible covering 806, and their respective upper surfaces are generally in the same plane, and permit the use of a thinner flexible covering as magnets 808 are recessed below magnet ridges 822 by approximately 1/32" for their protection and to prevent/reduce clanking, for example. Flexible covering 806 includes a wrap-around periphery 816 to wrap-around the edges of magnetically attractable base 802 and to retain flexible covering 806 to magnetically attractable base 802 without the need of adhesives or glues (also see, e.g., FIG. 7), although they may be used in a desired usage. As noted above, internal female threaded opening 820 within shaft 804 may be adapted to receive a corresponding male threaded structure (not shown) on a stand or the like to which mount device 800 is to be affixed for use.

As noted above, FIG. 7 is a bottom-up perspective view of flexible covering 806 illustrating magnet openings 814 and wrap-around periphery 816 in accordance with a preferred embodiment of the present invention. Flexible covering 806 may be affixed to magnetically attractable base 802 by stretching it over magnetically attractable base 802 so that magnet openings 814 receive any magnets 808 adhered to magnetically attractable base 802, or magnets 808 may be adhered to magnetically attractable base 802 after flexible covering 806 is fit over magnetically attractable plate 802. FIG. 9 illustrates a plan top-down view of flexible covering 806 in accordance with a preferred embodiment of the present invention. Outer ridge 820 surrounds the periphery of flexible covering/layer 806, with magnet ridges 822 surrounding respective magnet openings 814 within which magnets 808 are affixed/adhered. It is noted that an additional central magnet (not shown) may be affixed to base 802, and exposed through a respective magnet opening, as shown at position 850.

FIGS. 8B-8C are side views illustrating mounting of mount device 800 to magnetically attractable structure 900 in accordance with a preferred embodiment of the present invention. As illustrated in FIG. 8B, magnetically attractable structure 900 (which may be connected/affixed to, for example, percussion instrument or accessory 902) is positioned proximate mount device 800 in a desirable position as illustrated in FIG. 8B. As illustrated in FIG. 8C, magnetically attractable structure 900 is then moved 904 towards mount device 800 so that structure 900 is mounted to mount device 100 by the magnetic attraction of magnets 808 until magnetically attractable structure 900 contacts/compresses magnet ridges 822 and outer ridge 820 and is retained thereon/thereto by the magnetic force of such attraction. Upon contact, the magnetic attraction and the weight of magnetically attractable structure 900/instrument 902, compress/deform magnet ridges 822 and outer ridge 820, and there may be an air gap 805 of less than about 1/32" between the top of magnets 808 and the exposed surface of magnetically attractable structure 900. It is also appreciated that the magnetic attraction may decrease gap 805 and may eliminate gap 805 for one or more of magnets 808 in a controlled manner. That is, the recession of magnets 808 below magnet ridges 822, and outer ridge 820, prevents/minimizes/reduces any potential damage to magnets 808 and clanking, by slowing the velocity of any meeting of magnetically attractable structure 900 against the top of magnets 808. Further, it has been found that the use of magnetically attractable base 802 beneath magnets 808 increases the magnetic attraction between magnetically attractable structure 900 and mount device 800'. Magnetically attractable structure 900 is held to mount device 800' with sufficient force/attraction so that any percussion instrument or accessory 902 (generally instrument 902) affixed to magnetically attractable structure 900 may be utilized for its intended purpose such as striking/playing during practice or a performance.

To remove, or dismount, magnetically attractable structure 900/instrument 902 from magnetic mount device 800, magnetically attractable structure 900/instrument 902 may be, for example, grasped and pulled from mount device 800 either straight away, or by separating magnetically attractable structure 900 from one edge or side of mount device 800 and 'pealing' it from mount device 800. To prevent unintended attraction of mount device 800 to other magnetically attractable objects, such as steel, a dummy magnetically attractable structure (not shown) may cover mount device 800 during transport and assembly, or a padded dummy structure (e.g., a padded bag or box) covering magnetic mount device 800 introducing an air gap sufficient to reduce the magnetic attraction of magnets 808 above/around the padded dummy structure so as to prevent/minimize any magnetic attraction to any other unwanted magnetically attractable objects.

This embodiment, and that of FIGS. 4-5 and 6A-6C, may be circular and may measures approximately 3/5" in diameter. The magnetically attractable plate may have a total thickness or height of almost 1 1/4 inch including the elevation of the magnets positioned on the top and the coupling screw or stud attached to the bottom. The main body of the circular magnetically attractable plate may be approximately 1/8" thick and may be made from steel or other magnetically attractable metal. Attached to the underside of the magnetically attractable plate may be a 3/4" to 1" in length female coupler or stud either tack welded or screwed onto a male screw that has been pre-attached to the magnetically attractable plate. The female coupler or stud is designed to accept, for example, a 8 MM threaded male cymbal stand screw. The female coupler or stud may also be integral with the magnetically attractable plate.

The molded rubber (resilient flexible material or flexible covering) top/flexible layer may be fabricated where it's inside measurements are designed to snugly fit over the top of the magnetically attractable plate. This rubber-like piece may have from six to ten equally spaced holes (magnet openings) "cut out" of it's thickness to act as placeholders for solid disc magnets. The holes will be uniformly positioned around the perimeter of the rubber circle with approximately 1/8" of rubber-like material left between the edge of the hole and outside edge of the rubber-like circle. The flexible covering may have an average thickness of approximately 1/16" between the holes and in the center and immediately adjacent to the holes will have an elevation (e.g., ridges) exceeding the magnet height by approximately 1/32" in height. The height difference is designed to protect the magnets from sudden impact and to also dampen the "clang" sound of the magnets slapping (e.g., clanking) onto the metal or steel trays that will be attracted to the mount device. An additional function of the elevated rubber-like material is to prevent/reduce lateral slippage of the magnetically attractable structure across the flexible covering/flexible outer ridge and flexible magnet ridges. This may be assured by determining the coefficient of friction of the magnetically attractable structure and the flexible covering/flexible outer ridge and flexible magnet ridges. The flexible covering will have a 90 degree turn down edge around it's total circumference similar to a tennis can lid, or the like, where it will wrap around the edge of the magnetically attractable plate. This wrap-around serves for better adherence to the magnetically attractable plate, or main body, as well as padding and protection from undesired banging of the magnetically attractable plate onto other objects. The circular flexible covering may be adhered permanently to the magnetically attractable plate with adhesive. For the embodiment illustrated in FIGS. 4 and 6A-6C, the molded rubber (resilient flexible material or flexible covering) flexible covering/layer 406 does not fit around the periphery of disc 402, but leaves a portion of the upper surface of the disc edge exposed as discussed above. Stamping may form flexible covering/layer 406.

From bout six to ten disc magnets may be placed in each hole of the circular flexible covering on top and attracted to the magnetically attractable plate below. The attraction of the magnet to the magnetically attractable plate, and the edges of the rubber-like flexible covering may prevent movement of the magnets. As a result there may be no need for adhesive or screws to secure the magnets. The cumulative pull power of the magnets when positioned between two steel plates will have a pull power of a minimum design standard of 120 pounds. The cumulative pull power is a function of the size of each magnet (thickness and surface area), and the number of magnets used. Using smaller magnets may require more of them while using large magnets will reduce the need for quantity FIGS. 8B-8C are side views illustrating mounting of mount device 800 to magnetically attractable structure 900. As illustrated in FIG. 8B, magnetically attractable structure 900 (which may be connected/affixed to, for example, percussion instrument or accessory 902) is positioned proximate mount device 800 in a desirable position. As illustrated in FIG. 6C, magnetically attractable structure 900 is then mounted to mount device 800 the magnetic attraction of magnets 808 until magnetically attractable structure 900 contacts outer ridge 820 and magnet ridges 822 and is retained thereon/thereto by the magnetic force of such attraction. Upon contact there may be an air gap 805 of about 1/32" between the top of magnets 808 and the exposed surface of magnetically attractable structure 900. Outer ridge 820 and magnet ridges 822 may be compressed during the attachment of magnetically attractable structure 900 to mount device 800. As such, the non-compressed heights of respective outer ridge 820 and magnet ridges 822 above upper surface 807 of flexible covering 806 may be increased to provide an air gap 805 having an approximate height of 1/32". It is also appreciated that the magnetic attraction may decrease gap 805 and may eliminate gap 805 for one or more of magnets 808 in a controlled manner, with further compression of outer ridge 820 and magnet ridges 822. That is, the recession of magnets 808 below outer ridge 820 and magnet ridges 822 of flexible layer 806 prevents/minimizes/reduces any potential damage to magnets 808 and clanking, by slowing the velocity of any meeting of magnetically attractable structure 900 against the top of magnets 808. Further, it has been found that the use of magnetically attractable base 802 beneath magnets 808 increases the magnetic attraction between magnetically attractable structure 900 and mount device 800. Magnetically attractable structure 900 is held to mount device 800 with sufficient force/attraction so that any percussion instrument or accessory 902 (generally "instrument 902") affixed to magnetically attractable structure 800 may be utilized for its intended purpose such as striking/playing during practice or a performance.

To remove, or dismount, magnetically attractable structure 700/instrument 702 from magnetic mount device 400, magnetically attractable structure 700/instrument 702 may be, for example, grasped and pulled from mount device 400 either straight away, or by separating magnetically attractable structure 700 from one edge or side of mount device 400 and 'pealing' it from mount device 400. As noted above, to prevent unintended attraction of mount device 400 to other magnetically attractable objects, such as steel, a dummy magnetically attractable structure (not shown) may cover mount device 400 during transport and assembly, or a padded dummy structure (e.g., a padded bag or box) covering magnetic mount device 400 introducing an air gap sufficient to reduce the magnetic attraction of magnets 408 above/around the padded dummy structure so as to prevent/minimize any magnetic attraction to any other unwanted magnetically attractable objects.

Percussion instrument or accessory may be a music stand 'bookplate', percussion instrument trays that may be used to place/adhere shakers, triangles, small cymbals, claves, mallets, drumsticks, etc. Each would have a magnetically attractable structure, for example, a steel portion, placed strategically to attract such devices to a magnetic mount device. It is noted that select percussion instruments an accessories may be essentially made of a magnetically attractable material, such as steel, for example.

It is contemplated that any magnetic mount 100, 400, 800 may be retained/affixed to a stand, a drum rim, or the like using a clamp instead of any threaded opening 116/shaft 404, 804. It is noted that each of magnetically attractable plate 104, magnetically attractable base 402, and magnetically attractable base 802 may have a thickness greater than respective magnetically attractable material 300, and magnetically attractable structure 700, 900 to a degree to ensure that any magnet 108, 408, 808 retained upon respective magnetically attractable plate 104, magnetically attractable base 402, and magnetically attractable base 802 only by magnetic attraction, may not separate from respective magnetically attractable plate 104, magnetically attractable base 402, and magnetically attractable base 802 and adhere to respective magnetically attractable material 300 and magnetically attractable structures 700, 900 upon disengagement, as the magnetic attraction to the underlying respective magnetically attractable plate 104, magnetically attractable base 402, and respective magnetically attractable base 802 is sufficiently greater than that to respective magnetically attractable material 300 and magnetically attractable structure 700, 900 to retain respective magnets 108, 408, 808.

The advantages of the present invention, include, but are not limited to: (1) any lateral slippage of the magnetically attractable material across the flexible covering/flexible outer ridge and flexible magnet ridges during attachment and use is prevented/reduced; (2) a compact mounting device is provided that has a sufficiently strong magnetic connection to a prepared percussion instrument and/or accessory to prevent lateral slippage/unintended release during a performance or practice, for example; (3) many conventional mounts use brackets permanently designed into the sides or backs of instruments/accessories which causes them to be much heavier and bulky as the bracketing is not centrally located, this may cause the unit to be cantilevered from its side which lends to over engineering it for sturdiness, whereas the instant invention allows for central location of a magnetically attractable plate on the instrument/accessory allowing for a smaller structure and smaller footprint on the instrument/accessory and eliminating/reducing any potential cantilevering; (4) many conventional mounts require the use of screws to tighten the instrument/accessory leading to more time and work to assembly; (5) many conventional mounts are noisy and create unintended noise if not properly tightened/mounted; (6) the magnet mount device of the present invention is relatively small compared to many conventional mount devices and may be easily held in one hand; (7) precise centering/placement of the instrument/accessory on the magnetic mount device is not necessary; (8) the instrument/accessory may include another set of magnets upon its magnetically attractable structure to further enhance the stability when mounted to the magnetic mount device; (9) through the use of two magnetizable plates sandwiching the magnet(s), the pull force is increased so smaller sized and/or fewer magnets may be used to design a magnetic mount device for a given purpose/use having equivalent pull force; and (10) the magnetic mount device may be more compact, lighter weight and less expensive As described herein, but not limited thereto, the present invention is a magnetic mount device that may be affixed to a stand or the like, so that percussion instruments and accessories may be magnetically adhered to the magnet mount device during use, such as in a performance or during practice. Such percussion instruments and accessories would include a magnetically attractable structure, such as, for example, a steel structure, affixed thereto so as to be magnetically attractable to the magnetic mount device. The magnetic mount device includes features to prevent/reduce/minimize cracking, spalling or splitting of magnets 108 due to attachment/reattachment to the magnetically attractable structure. For example, the magnets include a magnet covering material such as neoprene or polychloroprene synthetic rubbers over their exposed surface, or the magnets are recessed below a protective flexible layer. The magnet covering material and the protective flexible layer may prevent/minimize lateral slippage of the adhered magnetically attractable structure/instrument/accessory during mounting/use by determination of the coefficient of friction of the adhered magnetically attractable structure and the magnet covering material/flexible covering/layer.

While particular embodiments of the present invention have been illustrated and described, it is not intended to limit the invention, except as defined by the following claims.

We claim:

1. A percussion mount device comprised of:
a base portion comprised of a first material, the base portion having an outer exposed portion, the outer exposed portion of the base portion having a magnetically attractable layer;
a plurality of magnetic structures arranged upon the magnetically attractable layer; and
threaded attachment devices within openings through the plurality of magnetic structures, through the magnetically attractable layer, and into the base portion, wherein the percussion mount device permits the secure mounting of a percussion instrument or accessory during use.

2. The percussion mount device of claim 1 wherein the plurality of magnetic structures directly contact an outer exposed portion of the magnetically attractable layer.

3. The percussion mount device of claim 1 wherein the plurality of magnetic structures are equally spaced about a periphery of the base portion.

4. The percussion mount device of claim 1 wherein the base portion and the magnetically attractable layer have the same shape, and each of the base portion and the magnetically attractable layer have a rectangular shape or an oval shape.

5. The percussion mount device of claim 4 wherein when the percussion mount device is brought into proximity of a magnetically attractable structure on a lower side of an object to be mounted to the percussion mount device, a magnetic attraction is formed between the magnetically attractable structure and the percussion mount device such that a pull force is increased by the use of the percussion mount device magnetically attractable layer.

6. The percussion mount device of claim 1 wherein the plurality of magnetic structures extend above a surface plane of the magnetically attractable layer.

7. The percussion mount device of claim 1 further comprising a protective layer over each exposed surface of the plurality of magnetic structures.

8. The percussion mount device of claim 1 wherein each of the plurality of magnetic structures has an exposed surface lying in a common plane.

9. The percussion mount device of claim 1 further comprising a flexible layer placed over the magnetically attractable layer and around each of the plurality of magnetic structures.

10. The percussion mount device of claim 9 wherein respective exposed surfaces of the plurality of magnetic structures are recessed below the flexible layer.

11. A percussion mount device comprised of:
a base portion comprised of a first material, the base portion having an outer exposed portion, the outer exposed portion of the base portion having a magnetically attractable layer; and
a plurality of magnetic structures arranged upon the magnetically attractable layer about a periphery of the magnetically attractable layer, wherein the arrangement of the magnetic structures creates a moment arm, wherein the percussion mount device permits the secure mounting of a percussion instrument or accessory during use.

12. The percussion mount device of claim 11 wherein the plurality of magnetic structures directly contact an outer exposed portion of the magnetically attractable layer.

13. The percussion mount device of claim 11 wherein the plurality of magnetic structures are equally spaced about a periphery of the base portion.

14. The percussion mount device of claim 11 wherein the plurality of magnetic structures extend above a surface plane of the magnetically attractable layer.

15. The percussion mount device of claim 11 wherein each of the plurality of magnetic structures has an exposed surface lying in a common plane.

16. A percussion mount device comprised of:
a base portion comprised of a first material, the base portion having an outer exposed portion, the outer exposed portion of the base portion having a magnetically attractable layer; and
a plurality of magnetic structures arranged upon the magnetically attractable layer in a rectangular, non-square, pattern, or an oval pattern, wherein the percussion mount device permits the secure mounting of a percussion instrument or accessory during use.

17. The percussion mount device of claim 16 wherein the plurality of magnetic structures directly contact an outer exposed portion of the magnetically attractable layer.

18. The percussion mount device of claim 16 wherein the plurality of magnetic structures are equally spaced about a periphery of the base portion.

19. The percussion mount device of claim 16 wherein the plurality of magnetic structures extend above a surface plane of the magnetically attractable layer.

20. The percussion mount device of claim 16 wherein each of the plurality of magnetic structures has an exposed surface lying in a common plane.

* * * * *